United States Patent [19]

Adriano

[11] Patent Number: 5,199,382
[45] Date of Patent: Apr. 6, 1993

[54] FEED TROUGH FOR YOUNG FARM BIRDS, IN PARTICULAR TURKEYS

[75] Inventor: Manfrin Adriano, Sandrigo, Italy
[73] Assignee: SKA S.p.A., Sandrigo, Italy
[21] Appl. No.: 840,978
[22] Filed: Feb. 26, 1992

[30] Foreign Application Priority Data

Mar. 4, 1991 [IT] Italy .................... 000010/91[U]

[51] Int. Cl.$^5$ .................................................. A01K 5/00
[52] U.S. Cl. ................................. 119/57.4; 119/52.1
[58] Field of Search .................. 119/53, 52.4, 52.2, 119/52.1, 57.4

[56] References Cited

U.S. PATENT DOCUMENTS

| | | | |
|---|---|---|---|
| 3,811,412 | 5/1974 | Murto et al. | 119/53 |
| 4,527,513 | 7/1985 | Hart et al. | 119/57.4 |
| 4,552,095 | 11/1985 | Segalla | 119/57.4 |
| 5,092,274 | 3/1992 | Cole et al. | 119/57.4 |

Primary Examiner—John G. Weiss
Attorney, Agent, or Firm—Browdy and Neimark

[57] ABSTRACT

The invention relates to a feed trough (1) for young farm birds, in particular turkeys. It is made of a suspended container plate (2) supported by a series of support struts (3), radially arranged, superiorly to which plate (2) is positioned a feed-dispensing cylindrical organ (4) connected to and in communication with a horizontal feed-transporting tubular conduit (6). The feed trough (1) is structured so that the distance (L) between the base (5) of the feed-dispenser organ (4) and the peripheral edge (8) of the the plate (2) is such that the small bird is able to reach the area close to the base (5) with its beak while keeping its claws outside the plate (2). The plate (2) is further equipped with a series of spokes (9) which spokes (9) extend radially and exhibit ends (10) to which the support struts (3) of the plate (2) are movably fixed.

5 Claims, 2 Drawing Sheets

FEED TROUGH FOR YOUNG FARM BIRDS, IN PARTICULAR TURKEYS

BACKGROUND OF THE INVENTION

The invention relates to a feed trough for young farm birds, in particular turkeys.

More specifically, the trough is of the type having a suspended circular plate, supported by a series of support struts arranged radially, superiorly to which plate a cylindrical organ is positioned, which organ is a feed dispenser of connected to and in communication with a horizontal tubular feed transport conduit. The said trough is usable in series along feed distribution lines in poultry sheds.

In the following description, particular reference will be made to young turkeys, but any kind of young poultry bird is intended, such as chickens, guinea-fowl etc.

At present, according to prior art practices, during the first period of mother-independence of turkeys, a feed trough of the above-described type is used, having a container plate with a low-rise peripheral edge (low-rise so that the animal can reach the feed with his beak) and a large diameter (about 45-50 cm) with the aim of enabling the fixing of the plate to support struts arranged radially, which struts are structurally predisposed to support container plates for adult animals, that is large-diameter plates.

The use of a large-diameter plate for turkeys during their formative period involves considerable inconvenients.

The animal, tending to search for the freshest food which is at the base of the cylindrical distributor organ, climbs on to the plate, helped by the fact that the perimeter edge is low, and soils the feed as well as causing its spilling-over from the plate.

In substance, therefore, there is a problem of hygiene involved, on the one hand, and an economical problem, due to the waste of good feed, on the other hand.

An essential aim of the present invention is thus that of eliminating the above-described prior-art inconvenients by providing a feed trough for young farm birds, especially turkeys, with which it will be possible to avoid the entrance of the animal itself on to the feed distributor plate.

SUMMARY OF THE INVENTION

This and other aims are all attained by the feed trough in question, comprising a suspended container plate, supported by a plurality of radially-arranged support struts, superiorly to which is positioned a cylindrical organ, being a feed dispenser and internally hollow and connected to an in communication with a horizontal tubular feed-transport conduit, characterised in that the distance between the base of the feed-dispensing cylindrical organ and the peripheral edge of the plate is such that the young bird is able to peck the area close to the said base while keeping its claws outside of the said plate.

BRIEF DESCRIPTION OF THE DRAWINGS

Further characteristics and advantages of the present invention will better emerge from the detailed description that follows, of a feed trough for young birds, made here in the form of a non-limiting example with reference to the accompanying illustrations, in which.

DESCRIPTION OF THE PREFERRED EMBODIMENTS

Figure 1:
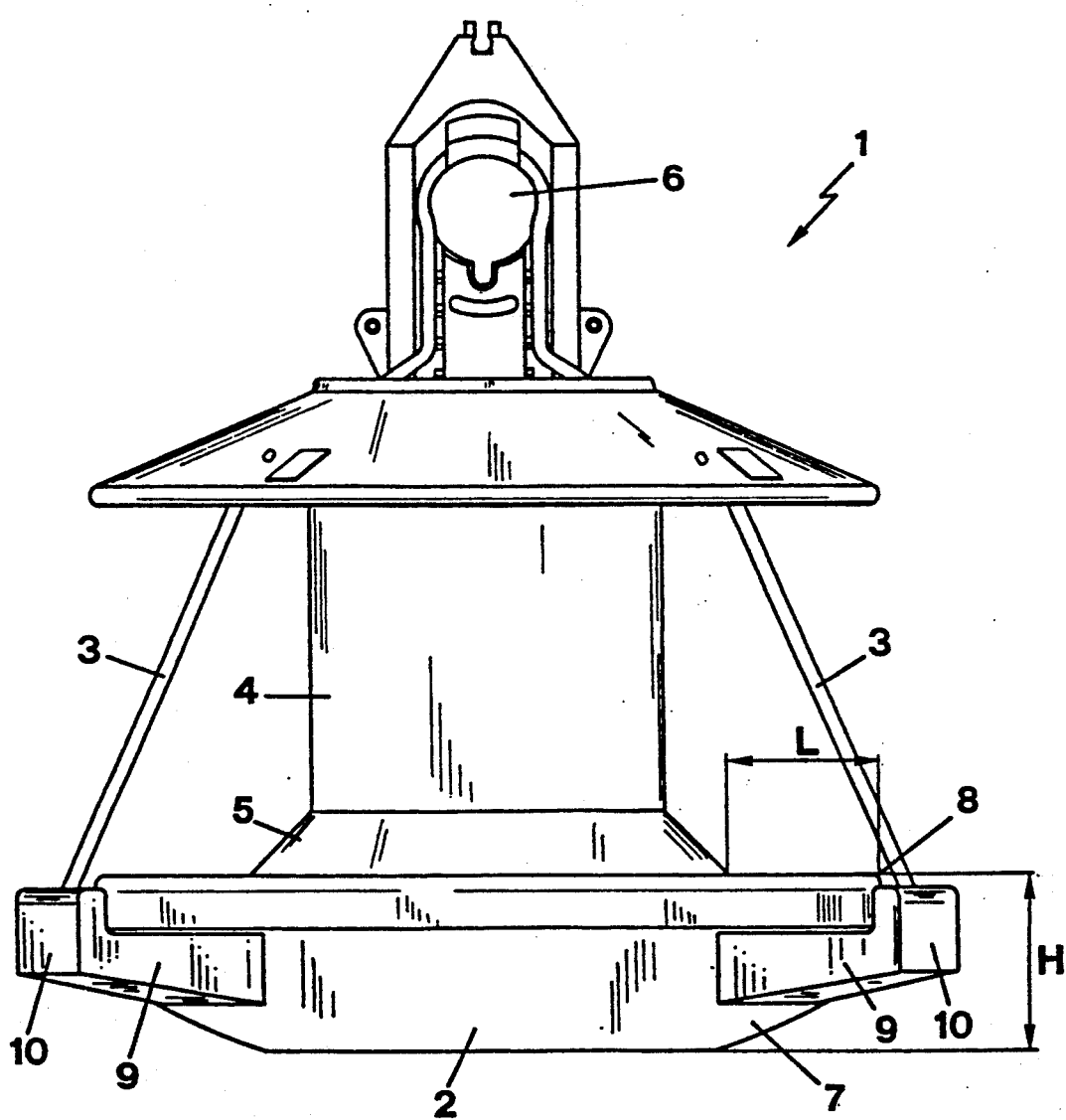
FIG. 1 shows the feed trough in side view.
Figure 2:
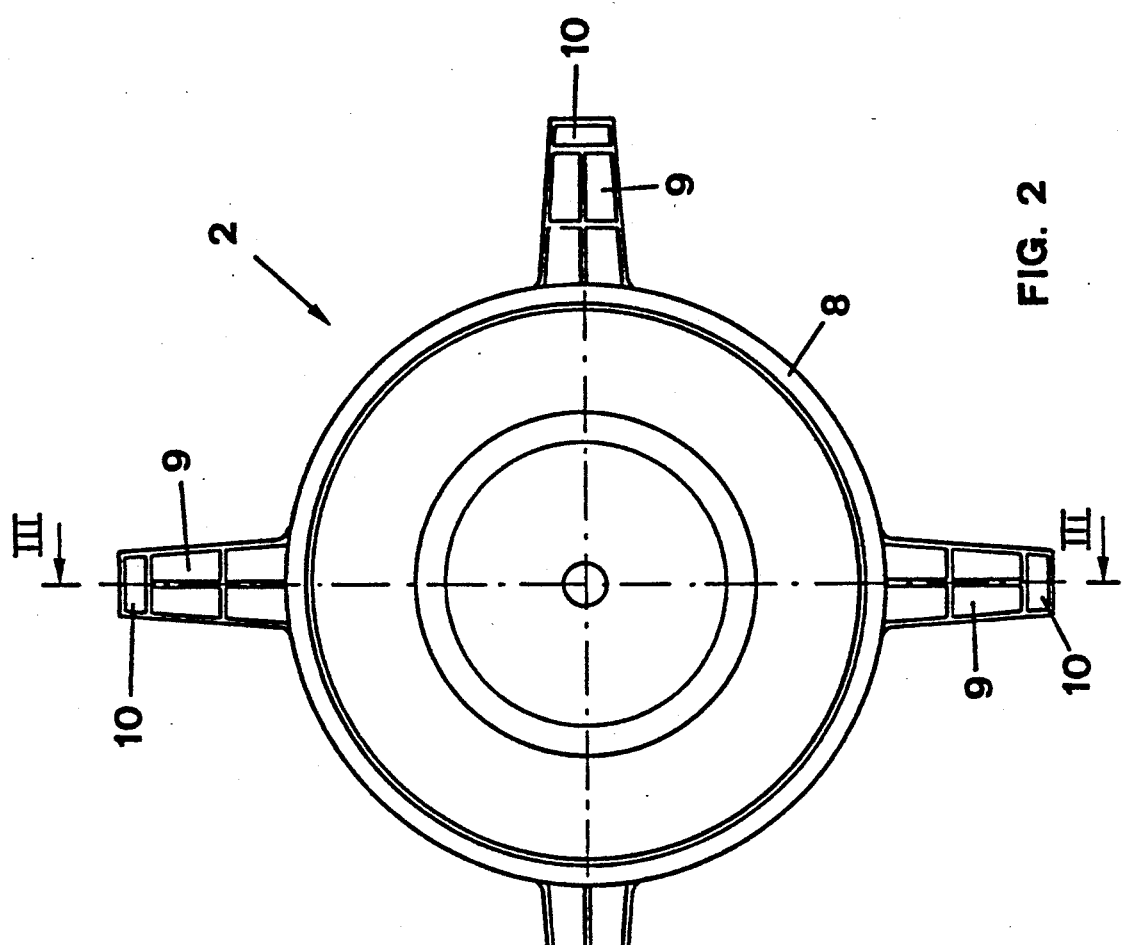
FIG. 2 shows the container plate from below.
Figure 3:
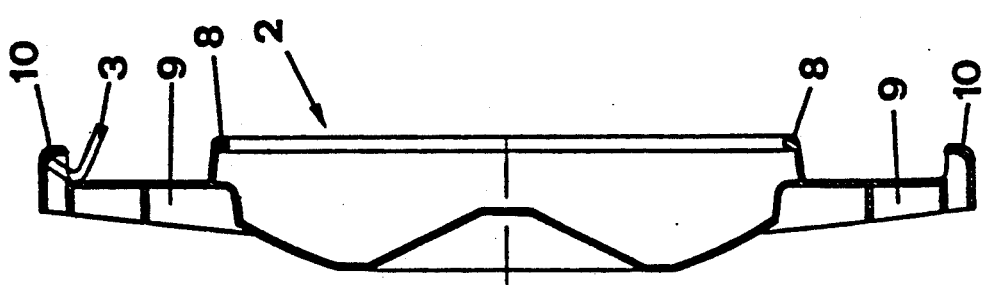
FIG. 3 shows the container plate in section along line III—III of FIG. 2.

With reference to the drawings, 1 denotes the feed trough object of the present invention.

It comprises essentially a circular container plate 2, supported by a series of support struts 3 arranged radially, superiorly to which is positioned a cylindrical organ 4 which organ 4 is the feed dispenser, internally hollow and flared in the direction of its inferior base 5, which cylindrical organ is connected to and in communication with a horizontal tubular conduit 6 for the transport of the feed.

The plate 2 exhibits a peripheral edge 7 of height H low enough to permit the animal to reach the internal part of the plate 2 with its beak.

Also, the distance L between the inferior base 5 of the cylindrical organ 4 and the peripheral edge 8 of the plate 2 is such that the young and therefore still small bird can reach with its beak the area close to the said base 5 while keeping its claws outside of the plate 2.

In this way the animal can reach the fresh feed at the base of the cylindrical organ 4, without climbing on to the plate 2 and thus the fouling of the said plate 2 and the waste of feed contained in it is avoided.

The plate 2 is equipped with a series of spokes 9 (numbering four in the example illustrated in the figures), which spokes 9 extend radially an exhibit ends 10 to which the said support struts 3 are movably fixed.

In this way the plate 2 can possibly be of small diameter, even where the feed trough 1 has support struts 3 which were originally destined for container plates suitable for adult animals.

Once the formative period has finished, and for a few days afterwards, it is thus possible to substitute the plate 2 with a traditional plate for adult animals, that is, having a higher peripheral edge and a larger diameter.

As for the size, in the case of turkeys a plate 2 having a diameter of about 33 cm is advisable, in contrast to a diameter of about 45-50 cm for adult turkeys.

Thus the invention attains its pre-established aims.

What is claimed is:

1. A kit comprising a feed trough for farm birds and a plurality of plates wherein said feed trough for farm birds comprises:
   a hollow cylindrical organ (4) having a flared portion (5) at a lower end thereof;
   an upper portion of said hollow cylindrical organ (4) engaged to an in communication with a horizontal tubular conduit (6) for feed transport;
   a plurality of support struts (3); and
   a first end of each of said plurality of support struts radially fixed to said upper portion of said hollow cylindrical organ (4);
   wherein said plurality of plates comprises;
   a plurality of circular container plates (2) each having a central pan bounded by a peripheral edge;
   a bottom and a plurality of integral spokes (9) extending radially from said peripheral edge (8);
   each outer diameter of said plurality of circular container plates being equal; and
   whereas, the diameter and a depth of each of said pans of said plurality of circular container plates are of a different size to accommodate different size farm birds;

wherein, a second end of each of said plurality of support struts are capable of being resiliently engaged to a free end of each of said plurality of integral spokes of one of said plurality of circular container plates' wherein said each of said plurality of circular container plates can be separately and selectively engaged to said plurality of struts depending on the size farm bird to feed.

2. A kit as claimed in claim 1, further comprising; a hook on said second end of each of said plurality of support struts and recess means on said free end of each of said integral spokes for engaging said hook.

3. A kit as claimed in claim 1, wherein a distance (H) between a top of said peripheral edge (8) and said bottom of said pan and a distance (L) between a free edge of said flared portion (5) and said top of said peripheral edge (8) of said each of said pans of said plurality of circular container plates is such as to enable a bird of a predetermined size to reach close to said free edge of said flared portion (5) with its beak while keeping its claws outside of said pan.

4. A kit as in claim 3, wherein said plurality of plates are of sufficient size for turkeys.

5. A kit as in claim 3, wherein at least one of said plurality of plates is of sufficient size for an immature farm bird and at least one of said plurality of plates is of sufficient size for an adult of the same breed of farm bird.

* * * * *